(12) United States Patent
Mitake (10) Patent No.: US 7,779,957 B2
(45) Date of Patent: Aug. 24, 2010

(54) FRAMEWORK OF VEHICLE (75) Inventor: Akitoshi Mitake, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 186 days.

(21) Appl. No.: 12/287,041

(22) Filed: Oct. 3, 2008

(65) Prior Publication Data
US 2009/0095559 A1  Apr. 16, 2009

(30) Foreign Application Priority Data
Oct. 3, 2007  (JP) ............................. 2007-259388

(51) Int. Cl.
*B60K 13/04*  (2006.01)
(52) U.S. Cl. .................. 180/312; 180/291; 180/296; 180/299
(58) Field of Classification Search ............. 180/312, 180/89.1, 54.1, 291, 296, 299
See application file for complete search history.

(56) References Cited
U.S. PATENT DOCUMENTS 5,195,607 A * 3/1993 Shimada et al. ............. 180/296
5,364,113 A * 11/1994 Goertzen .................... 280/81.6
5,813,491 A * 9/1998 Sato et al. ................... 180/309
6,378,645 B1 * 4/2002 Uegane et al. .............. 180/309
6,502,659 B2 * 1/2003 Akasaka ..................... 180/309
6,644,437 B1 * 11/2003 Hayman ..................... 181/268
7,364,002 B2 * 4/2008 Mabuchi et al. ............. 180/296

FOREIGN PATENT DOCUMENTS

JP  05-042829  2/1993

* cited by examiner

*Primary Examiner*—Paul N Dickson
*Assistant Examiner*—Karen Jane J Amores
(74) *Attorney, Agent, or Firm*—Flynn, Thiel, Boutell & Tanis, P.C.

(57) ABSTRACT

A framework of a vehicle provided with an engine mounted in an engine room and having a crank shaft, includes a subframe extending in the lateral direction of a space at the back of the engine. A steering gear box provided above the subframe extends in the lateral direction and an exhaust pipe that extends in the longitudinal direction crosses the gear box. A longitudinally extending recessed portion is formed on a top surface of the subframe so that the exhaust pipe provided under the steering gear box enters the recessed portion. Arch-shaped reinforcing members spanning over the exhaust pipe are provided on a top surface of the subframe at longitudinally spaced positions. The reinforcing member toward the front of the vehicle breaks when a physical impact is applied to the front of the vehicle before the reinforcing member disposed toward the rear of the vehicle.

2 Claims, 5 Drawing Sheets

FRAMEWORK OF VEHICLE

FIELD OF THE INVENTION

The present invention relates to a framework of a vehicle, and more specifically to a framework of a vehicle having a mounting device which delivers vibrations little to a vehicle's body and is excellent in the capability of absorbing physical shocks generated in collisions between vehicles.

BACKGROUND OF THE INVENTION

In a framework of a vehicle disclosed in Japanese Patent Laid-Open Publication No. HEI 5-42829, a subframe extending in the lateral direction of the vehicle under an engine room of the vehicle and at the same time at the back of an engine, and a mounting system for a steering gear box and/or engine and an exhaust pipe are provided above the subframe.

Figure 8:
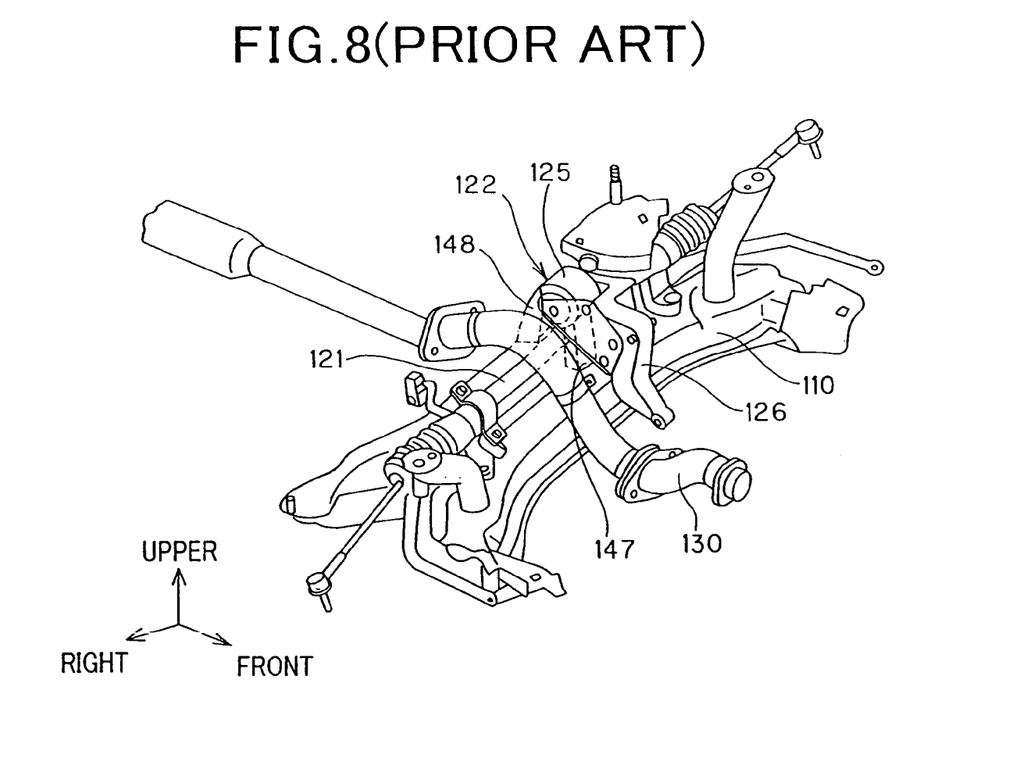
FIG. 8 is a perspective view illustrating a subframe based on the conventional technology viewed from a diagonally right forward position.

In a conventional type of vehicle framework, there is provided a subframe 110 extending in the lateral direction of a vehicle at a back of an engine as shown in FIG. 8.

Above the subframe 110, as shown in FIG. 8, there are provided a steering gear box 121 extending in the lateral direction of the vehicle and an exhaust pipe 130 extending in the longitudinal direction of the vehicle in the state where the two components cross each other.

Provided above the steering gear box 121 is an engine mounting device 122 (also referred to "a mounting device") which supports an engine as shown in FIG. 8.

This engine mounting device 122 has a rear mount 125 which is a rubber cushion. An internal cylindrical portion of the rear mount 125 is jointed via a mount bracket 126 to a transmission as shown in FIG. 8, and an external cylindrical portion of the rear mount 125 is joined via first and second mounting sections 147, 148 to the subframe 110.

In this configuration, the rear mount 125 of the engine mounting device 122 is provided at a position away from the subframe 110 in the vertical direction.

As a result, there is the disadvantage that the first and second mounting sections 147, 148 connecting the engine mounting device 122 to the subframe 110 easily vibrate in association with vibrations of the engine.

In addition, when a vehicle collides with another vehicle, if the engine can move rearward in the vehicle, excellent shock absorption capability is ensured, but in the conventional mounting device having the configuration as described above, movement of the rear mount 125 is restricted by the first and second mounting sections 147, 148, and the engine can not move rearward sufficiently, and therefore the shock absorption capability is disadvantageously low.

An object of the present invention is to provide a framework of a vehicle with a mounting device provided on a subframe thereof which delivers little vibration to the vehicle body and provides excellent shock absorption capability when the vehicle collides with another vehicle.

SUMMARY OF THE INVENTION

To eliminate the defects of a vehicle's framework based on conventional technology as described above, the present invention provides a framework of a vehicle provided with an engine mounted in an engine room with the crank shaft oriented in a lateral direction of the vehicle; a subframe extending in the lateral direction of a space at the back of the engine in a longitudinal direction of the vehicle; a steering gear box provided above the subframe and extending in the lateral direction of the vehicle and an exhaust pipe extending in the longitudinal direction of the vehicle, the gear box and exhaust pipe crossing each other. A mounting device is provided above the steering gear box for supporting the engine. A recessed portion extending in the longitudinal direction is formed on a top surface portion of the subframe, the exhaust pipe is provided under the steering gear box in the vertical direction in a state wherein a lower portion of the exhaust pipe goes into the recessed portion, front and rear arch-shaped reinforcing members spanning over the exhaust pipe are provided on a top surface of the subframe at positions away from each other in the longitudinal direction of the vehicle, the mounting device is fastened to the reinforcing members, the front reinforcing member provided in a front portion of the vehicle is made of a material which is more easily broken when a physical impact is applied from a front portion of the vehicle as compared to the rear reinforcing member provided in a rear portion of the vehicle, and thus strength of two edges of each of the reinforcing members joined to the subframe are differentiated from each other.

As described above, the present invention provides a framework of a vehicle provided with an engine mounted in an engine room with the crank shaft oriented in the lateral direction of the vehicle; a subframe extending in the lateral direction of a space at the back of the engine in the longitudinal direction of the vehicle; a steering gear box provided above the subframe and extending in the lateral direction of the vehicle and an exhaust pipe extending in the longitudinal direction of the vehicle, the two components crossing each other; and a mounting device provided above the steering gear box for supporting the engine. In this framework for a vehicle, a recessed portion extending in the longitudinal direction is formed on a top surface portion of the subframe, the exhaust pipe is provided under the steering gear box in the vertical direction in a state where a lower portion of the exhaust pipe goes into the recessed portion, arch-shaped reinforcing members spanning over the exhaust pipe are provided on a top surface of the subframe at positions away from each other in the longitudinal direction of the vehicle, the mounting device is fastened to the reinforcing members, one of the two reinforcing members provided in a front portion of the vehicle is made of a material which is more easily broken when a physical impact is applied from a front portion of the vehicle as compared to the other reinforcing member provided in a rear portion of the vehicle, and strength of joint sections at two edges of each of the reinforcing members joined to the subframe are differentiated from each other.

In this configuration, because a recessed portion extending in the longitudinal direction is formed on a top surface portion of the subframe and the exhaust pipe is provided under the steering gear box in the vertical direction in the state where a lower portion of the exhaust pipe goes into the recessed portion, the steering gear box and the mounting device above the steering gear box can be provided at positions closer to the subframe in the vertical direction as compared to a case where the recessed portion is not provided, and therefore the supporting section for supporting the mounting device on the subframe vibrates little.

In addition, because arch-shaped reinforcing members spanning over the exhaust pipe are provided on a top surface of the subframe at positions away from each other in the longitudinal direction of the vehicle and the mounting device is fastened to the reinforcing members, there is provided a configuration in which the mounting device is supported on the subframe with the arch-shaped reinforcing members with little deformation even when a load is applied thereto in the vertical direction or in the lateral direction of the vehicle, and wherein little vibration of the engine is delivered to the vehicle body.

Furthermore, because one of the two reinforcing members provided in a front portion of the vehicle is made of a material which is more easily broken when a physical impact is applied from a front portion of the vehicle as compared to the reinforcing member provided in a rear portion of the vehicle, the strength of joint sections at two edges of each of the reinforcing members joined to the subframe are differentiated from each other. Therefore, even if the vehicle collides with another vehicle, a joint of the reinforcing member in the front portion of the vehicle having a smaller strength is broken first, and the other one is broken later. Because of the configuration, the engine can move backward in the longitudinal direction of the vehicle, so that a space in the front portion of the vehicle for absorption of a physical impact can be enlarged to better absorb physical impacts loaded to the vehicle.

DETAILED DESCRIPTION OF THE INVENTION

FIG. 1 to FIG. 7 show embodiments of the present invention.

Figure 2:
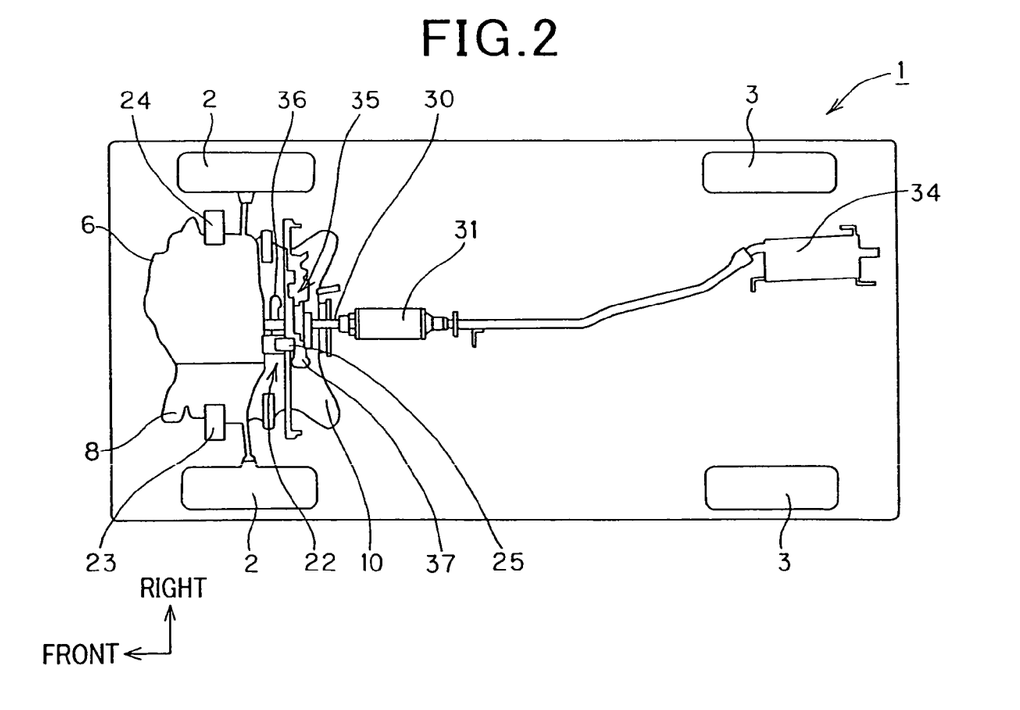
FIG. 2 is a general bottom view illustrating a vehicle.
Figure 3:
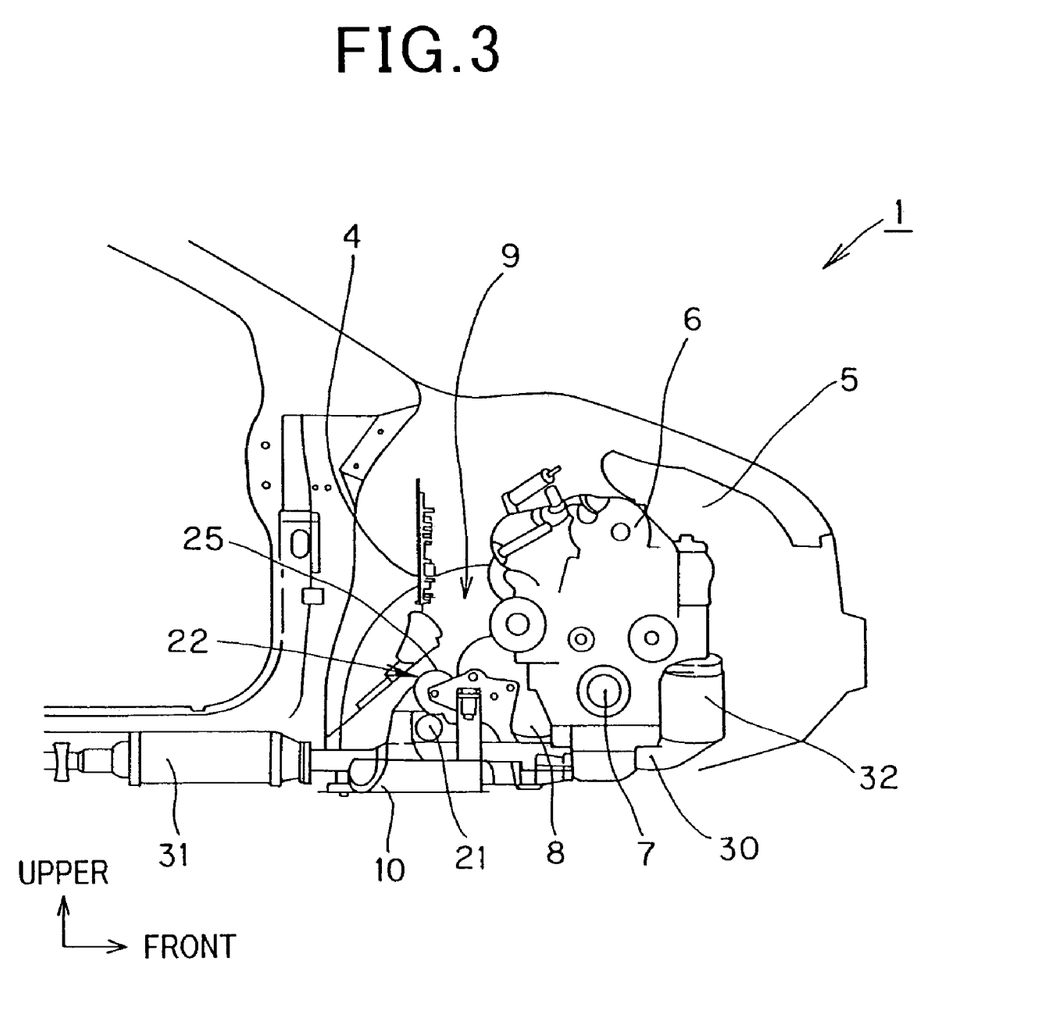
FIG. 3 is a general right side view illustrating a front portion of the vehicle.

In FIG. 2 and FIG. 3, the reference numeral 1 denotes a vehicle, 2 denotes front wheels of the vehicle, 3 denotes rear wheels of the vehicle, 4 denotes a dash panel, 5 denotes a front portion of the vehicle 1, namely an engine room defined by the dash panel 4 between the front wheels 2, and 6 denotes an engine, such as a diesel engine mounted in the engine room 5 (referred to simply as an engine hereinafter).

As shown in FIG. 2 and FIG. 3, the engine 6 with a crank shaft 7 thereof provided in the lateral direction of the vehicle and a transmission 8 are provided in the engine room 5 of the vehicle 1.

Furthermore, as shown in FIG. 2 and FIG. 3, a subframe 10 extending in the lateral direction of the vehicle 1 is provided in a space 9 at the back of the engine 6 in the longitudinal direction of the vehicle 1.

Two sections at the right and left sides of the engine 6 and the transmission 8 are supported on the vehicle 1 with a left mount 23 and a right mount 24, and a rear portion of the engine 6 is supported on the subframe 10 with an engine mounting device 22.

Figure 4:
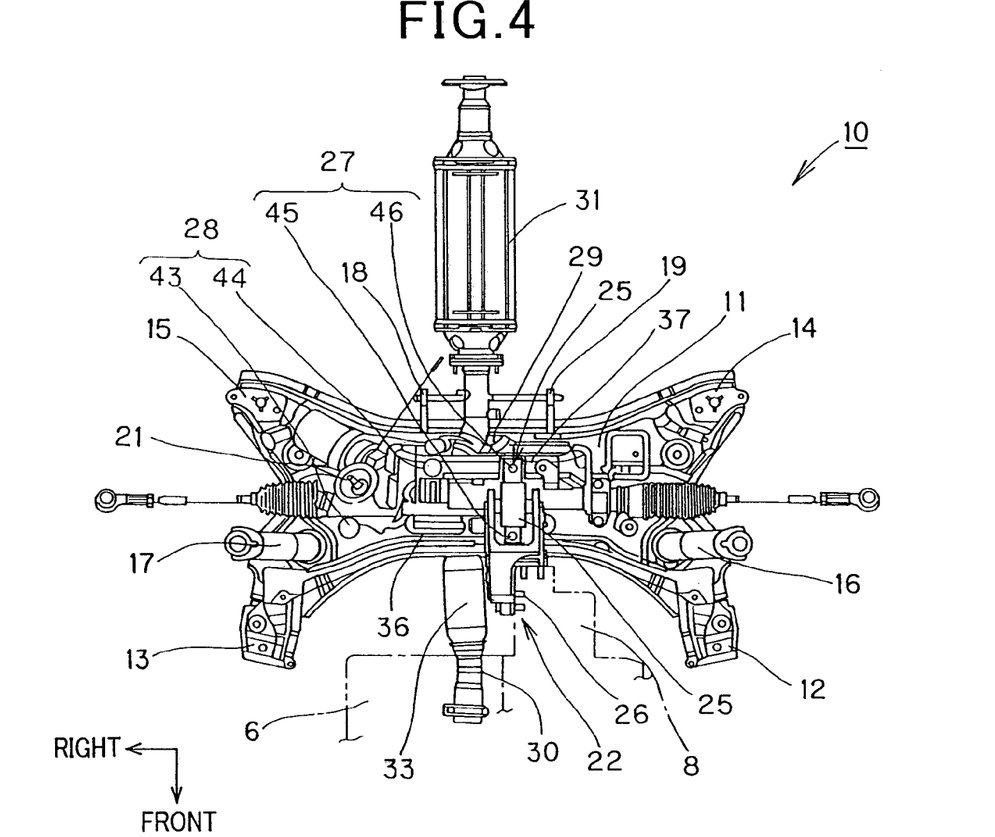
FIG. 4 is a general top view illustrating a configuration around a subframe.
Figure 6:
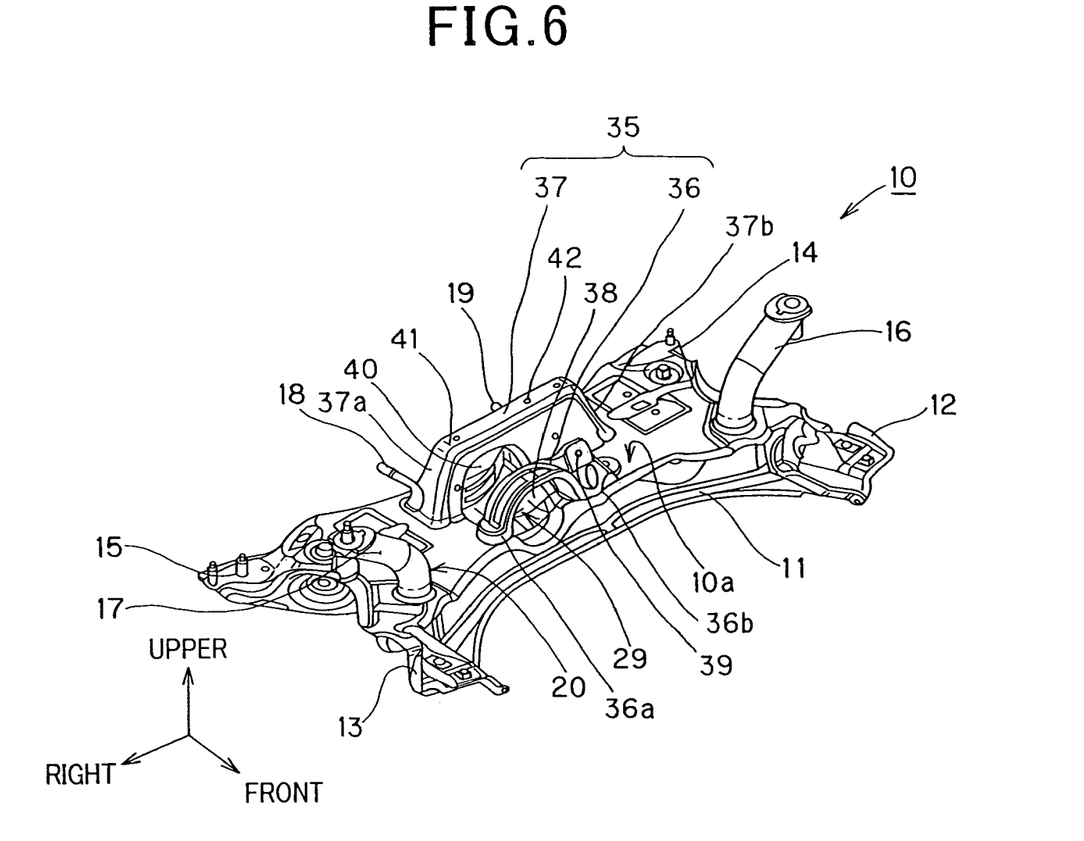
FIG. 6 is a perspective view illustrating the subframe with the mounting device provided thereon when viewed from a diagonally right forward position.
Figure 7:
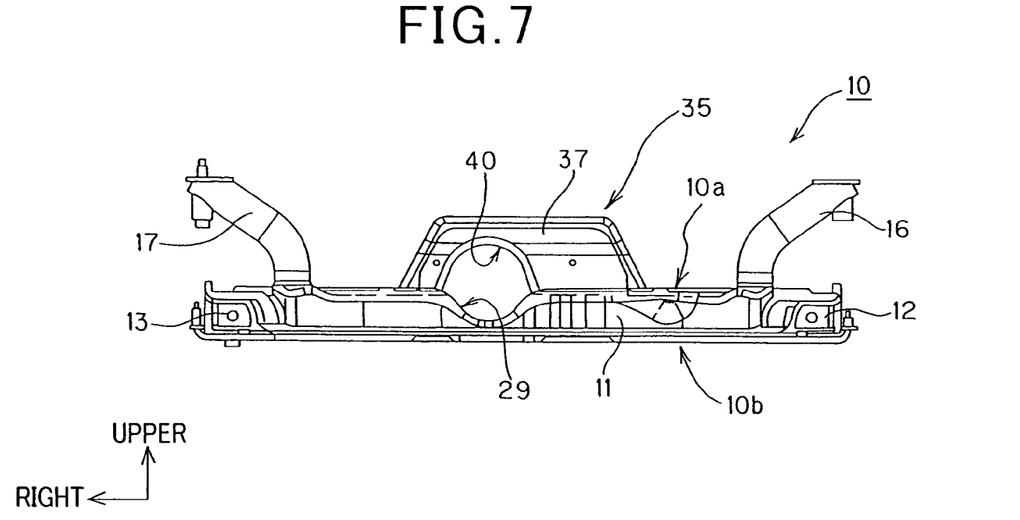
FIG. 7 is a front view illustrating the subframe.

As shown in FIG. 4, FIG. 6, and FIG. 7, the subframe 10 comprises a base body section 11, a first front suspension mounting section 12 formed in the left side of the vehicle by protruding forward a laterally left side portion of the base body section 11 in the longitudinal direction of the vehicle 1, a second front suspension mounting section 13 formed by protruding forward a laterally right portion of the base body section 11 in the longitudinal direction of the vehicle. A first vehicle body mounting section 14 is provided in the left side of the vehicle formed by protruding backward a laterally left side portion of the basic or base body 11 in the longitudinal direction of the vehicle, and a second vehicle body mounting section 15 is provided in the right side of the vehicle formed by protruding backward a laterally right side portion of the base body 11 in the longitudinal direction of the vehicle. A first vehicle body mounting member 16 extends upward from a central portion of the laterally left side portion of the base body section 11 and faces diagonally upward to the laterally left portion of the vehicle. A second vehicle body mounting member 17 extends upward from a central portion of the laterally right side portion of the base body section 11 and faces diagonally upward to the laterally right portion of the vehicle. Two hangers 18, 19 protrude backward in the longitudinal direction of the vehicle from the central portion of the base body section 11 so that the hangers 18, 19 hold an exhaust pipe 30 described later inbetween, and a mounting section 20 for mounting a steering gear box 21 described later.

Because of the configuration described above, a front suspension can swingably be mounted onto the subframe 10 with the first and second front suspension mounting sections 12, 13.

Furthermore, the subframe 10 can be tightly mounted on a vehicle body of the vehicle 1 with the first and second vehicle body mounting sections 14, 15 and the first and second vehicle body mounting members 16, 17.

Figure 5:
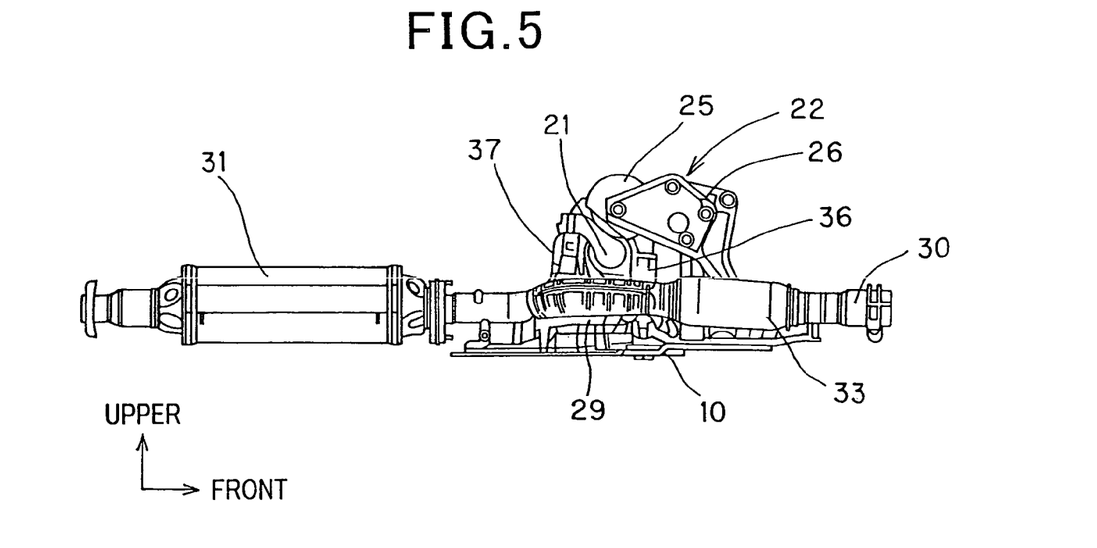
FIG. 5 is a general right side view illustrating the configuration around the subframe.

On a top surface 10a of the subframe 10, as shown in FIG. 3 to FIG. 5, the steering gear box 21 extending in the lateral direction of the vehicle and the exhaust pipe 30 extending in the longitudinal direction of the vehicle are provided above the subframe 10 in the state where the two components (the steering gear box 21 and the exhaust pipe 30) cross each other. Also the engine mounting device 22 (also referred to as "a mounting device") for supporting the engine 6 is provided above the steering gear box 21.

Figure 1:
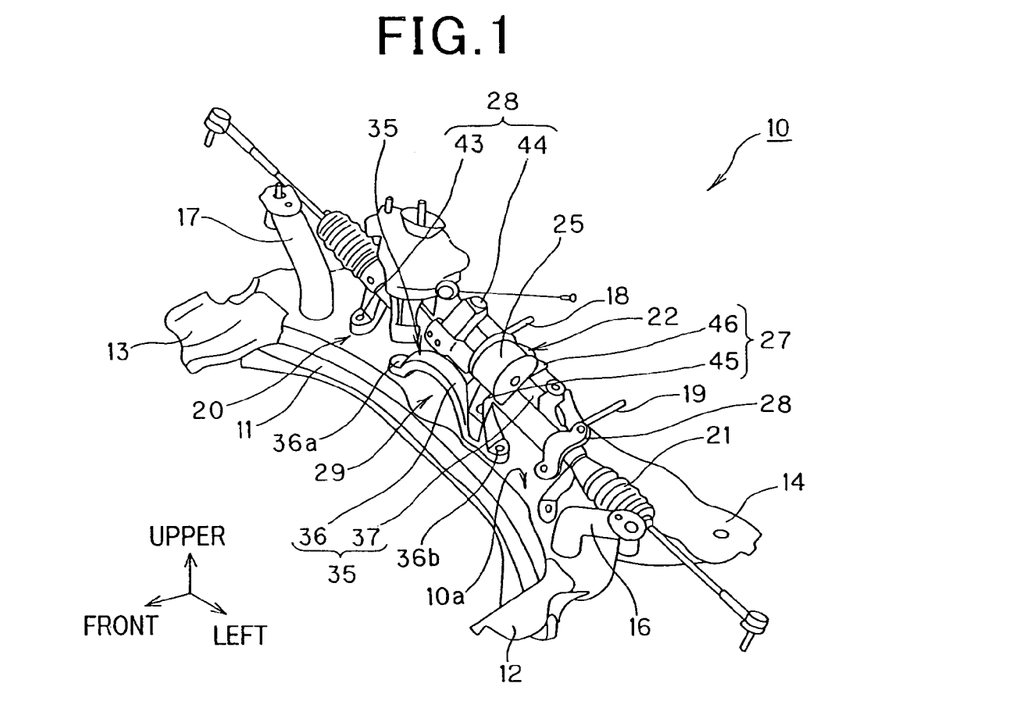
FIG. 1 is a perspective view illustrating a subframe on a mounting device according to an embodiment of the present invention when viewed from a diagonally left forward position.

In this configuration, the engine mounting device 22 comprises, as shown in FIG. 1 and FIG. 5, a rear mount 25 having a rubber cushion and fixed to the subframe 10 and a mount bracket 26 joining the rear mount 25 to the transmission 8. The rear mount 25 is attached to a reinforcing member 35 described later via a mount attaching section 27 protruding in the longitudinal direction of the vehicle as shown in FIG. 1.

The steering gear box 21 is attached via a plurality of steering gear box mounting sections 28 to the subframe 10 as shown in FIG. 1.

In this configuration, a recessed portion 29 extending in the longitudinal direction of the vehicle is formed on the top surface section 10a of the subframe 10. The exhaust pipe 30 is provided under the steering gear box 21 in the vertical direction in the state where a lower portion of the exhaust pipe 30 enters the recessed portion 29.

As compared to a case where the recessed portion 29 is not provided, the steering gear box 21 and the engine mounting device 22 above the steering gear box 21 can be provided at positions closer to the subframe 10 in the vertical direction. This arrangement makes it possible to provide a structure in which a supporting section for supporting the engine mounting device 22 onto the subframe 10 is vibrated little in association with vibrations of the engine.

The recessed portion 29 is formed by recessing a substantially central portion of the top surface portion 10a of the subframe 10 as shown in FIG. 1, FIG. 6 and FIG. 7 so that a bottom surface 10b of the subframe 10 is not broken.

Furthermore in this configuration, as shown in FIG. 3 to FIG. 5, the exhaust pipe 30 of the engine 6 extends backward over the subframe 10 in the longitudinal direction of the vehicle, and a particulate filter 31 is provided in the exhaust pipe 30 at the back of the subframe 10 in the longitudinal direction of the subframe 10.

In this configuration, an upstream end portion of the exhaust pipe 30 is connected to an exhausting side of the engine 6 which is a front side of the engine 6 when viewed in the longitudinal direction of the vehicle as shown in FIG. 2 to FIG. 5, a catalyst 32 for oxidization is provided on the way thereof, and a flexible tube 33 is connected to a front side of the recessed portion 29 when viewed in the longitudinal direction of the vehicle.

The exhaust pipe 30 extending over the recessed portion 29 connects to the particulate filter 31, and a downstream side of the particulate filter 31 connects to a muffler 34 provided between the rear wheels 3 of the vehicle 1 and at the same time at a position close to the laterally right side rear wheel 3 of the vehicle 1.

In the structure described above, a length of the exhaust pipe 30 up to the particulate filter 31 is short, so that a temperature of the exhaust gas flowing into the particulate filter 31 is prevented from being lowered. Thus the particulate filter 31 can be maintained at a temperature level at which particulates can be burnt for removal, and the purifying capability of the particulate filter 31 can be improved.

On the other hand, arch-shaped reinforcing members 35 spanning over the recessed portion 29 and the exhaust pipe 30 respectively are provided at positions away from each other on the top surface 10a of the subframe 10.

The engine mounting device 22 is joined via the reinforcing members 35 to the top surface 10a of the subframe 10.

To describe the configuration in more detail, the reinforcing members 35 comprise a first reinforcing member 36 which is a reinforcing member provided in the front portion of the vehicle and a second reinforcing member 37 which is a reinforcing member provided in the rear portion of the vehicle.

The first reinforcing member 36 of the reinforcing members 35 is provided in a front portion of the subframe 10 when viewed in the longitudinal direction of the vehicle as shown in FIG. 5 and FIG. 6, and is joined via a first joint section 36a and a second joint section 36b at both sides of the vehicle in the lateral direction to the subframe 10.

The second reinforcing member 37 of the reinforcing members 35 is larger than the first reinforcing member 36 as shown in FIG. 1 and FIG. 6, and is provided with a prespecified space and disposed backward from the first reinforcing member 36 in the longitudinal direction of the vehicle, and is joined via the first joint section 37a and a second joint section 37b to the subframe 10.

Provided in the first reinforcing member 36 is a first upper recessed portion 38 facing against the recessed portion 29 provided below to form a cylindrical penetrating portion. In addition, the first reinforcing member forms an arch-shaped portion spanning over the exhaust pipe 30.

Dimensions of the second joint section 36b of the first reinforcing member 36 in the lateral direction of the vehicle and in the thickness direction are larger than those of the first joint section 36a, and a mounting section 39 for the engine mounting device 22 is monolithically provided on a top surface of the second joint section 36b.

Because of the configuration as described above, a cross-sectional area of the second joint section 36b is larger than that of the first joint section 36a to provide a structure with enhanced strength.

On the other hand, provided in the second reinforcing member 37 is a second upper recessed portion 40 facing against the recessed portion 29 provided below to form a cylindrical penetrating portion. In addition, the second upper recessed portion forms an arch-shaped portion spanning over the exhaust pipe 30.

In the second reinforcing member 37, a dimension of the second joint section 37b in the lateral direction of the vehicle is larger than that of the first joint section 37a, and, as shown in FIG. 1 and FIG. 6, a first mounting hole section 41 for the steering gear box 21 is provided in the laterally right side of the vehicle, and furthermore a second mounting section 42 for the engine mounting device 22 is provided in the laterally left side of the vehicle.

Therefore, deformation of the subframe 10 generated along the recessed portion 29 can substantially be suppressed by forming and providing the first reinforcing member 36 and the second reinforcing member 37 each constituting the reinforcing members 35 with an arch-shaped form spanning over the exhaust pipe 30 at both sides of the recessed portion 29 in the longitudinal direction.

Furthermore, the steering gear box 21 is provided between the first reinforcing member 36 and the second reinforcing member 37 as shown in FIG. 1, FIG. 4, and FIG. 5, and is joined via the steering gear box mounting section 28 to the subframe 10.

In this configuration, the steering gear box mounting section 28 at a laterally right side of the vehicle comprises a first steering gear box mounting section 43 in the longitudinally front portion of the vehicle and a second steering gear box mounting section 44 in the longitudinally rear portion of the vehicle.

The steering gear box 21 is attached to the top surface 10a of the subframe 10, as shown in FIG. 4, with the first steering gear box mounting section 43 attached by using the mounting section 20 formed on the top surface section 10a of the subframe 10 and the second steering gear box mounting section 44 provided in the rear side and attached to the laterally right side of the vehicle by using the first mounting section 41 formed in the second reinforcing member 37 of the reinforcing members 35.

Therefore, the second reinforcing member 37 as the reinforcing member 35 joins the steering gear box 21 to the top surface 10a of the subframe 10 to suppress deformation of the subframe 10.

Furthermore, the engine mounting device 22 is joined to the first reinforcing member 36 and the second reinforcing member 37.

Namely, the engine mounting device 22 has the mount attaching section 27, and this mount attaching section 27 comprises, as shown in FIG. 1, a first mount attaching section 45 provided in the longitudinally front portion of the vehicle and a second mount attaching section 46 provided in the longitudinally rear portion of the vehicle.

As shown in FIG. 1 and FIG. 6, the engine mounting device 22 is joined to the first reinforcing member 36 and the second reinforcing member 37 with the first mount attaching section 45 attached by using the attaching section 39 formed in the side of the second joint section 36b of the first reinforcing member 36 and the second mount attaching section attached by using the second mounting hole 42 formed in the side of the second joint section 37b of the second reinforcing member 37.

In the configuration described above, the engine mounting device 22 is joined via the first reinforcing member 36 and the second reinforcing member 37, each having an arch-shaped form and little deforming loads in the vertical direction as well as in the lateral direction of the vehicle to the subframe 10. Therefore vibrations of the engine that are delivered to the vehicle body are minimized.

Furthermore, one of the two reinforcing members 36 and 37, the first reinforcing member 36 provided in the longitudinal front portion of the vehicle is formed with a material which is more easily broken by a physical impact loaded in the longitudinal direction to the front portion of the vehicle as compared to the second reinforcing member 37 provided in the rear portion of the vehicle, and in addition, a strength of the first joint section 36a of the first reinforcing member 36 to the subframe 10 is differentiated from a strength of the second joint section 36b.

Therefore, when the vehicle collides with another vehicle, the first joint section 36a having a lower strength is first broken and then the second joint section 36b is broken, so that the engine mounting device 22 can move backward in the longitudinal direction of the vehicle.

Since the engine 6 can move backward in the longitudinal direction of the vehicle, a space for absorbing a physical impact loaded to a front portion of the vehicle in the longitudinal direction is enlarged, so that the physical impact loaded to the vehicle can be absorbed more effectively.

To describe in more detail, of the two reinforcing members 35, the second reinforcing member 37 provided in the rear portion of the vehicle is made with an iron-based plate in a state where the second reinforcing member 37 is monolithic with the subframe 10. The first reinforcing member 36 is made with a material which is more easily broken when a physical impact is loaded from before backward as compared to a material for the second reinforcing member 37, for instance of an aluminum-based cast material.

Because of the features of the vehicle structure according to the present invention, weight of the first reinforcing member 36 can be reduced, and at the same time the capability for absorbing a physical impact generated in a collision between vehicles can be improved.

A method of differentiating a strength of the first joint section 36a of the first reinforcing member 36 joined to the subframe 10 from that of the second joint section 36b is described below.

Strengths of the first joint section 36 and the second joint section 36b vary according to cross-sectional forms of the two joint sections or to a number of fixing tools used for fixing the joint sections 36a and 36b.

In the embodiment of the present invention, dimensions of the second joint section 36b in the lateral direction of the vehicle, as well as in the thickness direction, are larger than those of the first joint section 36a, and a strength of the second joint section 36b is higher than that of the first joint section 36a.

Effects provided by the present invention are described below.

Since a recessed portion extending in the longitudinal direction of the vehicle is formed on a top surface of the subframe and also an exhaust pipe is provided under the steering gear box in the vertical direction in the state where a lower portion thereof enters the recessed portion, the steering gear box and the mounting device above the steering gear box can be provided at positions closer to the subframe in the vertical direction as compared to a case where the recessed portion is not provided, which enables a structure in which a supporting section for supporting the mounting device on the subframe vibrates little.

Furthermore, since the reinforcing members 35 having an arch-shaped form and span over the exhaust pipe 30, they are provided at positions away from each other in the longitudinal direction of the vehicle on the top surface 10a of the subframe 10. The engine mounting device 22 is joined to the reinforcing members 35. Thus deformation of the recessed portion 29 is suppressed by the arch-shaped reinforcing members 35 which deform little against loads in the vertical direction as well as in the lateral direction of the vehicle. Also solidity of the engine mounting device 22 when supported on the subframe 10 is improved, which enables a structure in which minimal vibrations of the engine reach the vehicle body.

Furthermore, when a collision between vehicles occurs, a front portion of the vehicle 1 deforms due to a physical impact generated in the collision, and the engine room 5 is shrunk due to deformation of the vehicle's front portion, as deformation of the vehicle's front portion affects the engine 6.

When the physical impact generated in a collision between vehicles is delivered to the engine 6, the engine 6 is pressed backward in the longitudinal direction of the vehicle, so that the first and second reinforcing members 36, 37 fixed to the subframe 10 are affected by the physical impact via the rear mount 25 for supporting the engine 6.

In this configuration, because the second reinforcing member 37 provided in the rear portion of the vehicle is formed with an ion-based plate material in the state where the second reinforcing member 37 is monolithic with the subframe 10. The first reinforcing member 36 provided in the front portion of the vehicle is formed with a material which is more easily broken when a physical impact is loaded from the front of the vehicle as compared to the ion-based second reinforcing member 37, for instance, with an aluminum-based cast material, and also because strengths of the first joint section 36a and the second joint section 36b used for joining both edges of the first reinforcing member 36 are differentiated from each other. The first joint section 36a having a lower strength is broken first when a physical impact is loaded in collision between vehicles, and then the second joint section 36b having a higher strength as compared to the first joint section 36a is broken later.

Namely, because the first reinforcing member 36 is made from a material which is easily broken by a physical impact and strengths of the first joint section 36a and the second joint section 36b provided at both edges of the first reinforcing member 36 are differentiated from each other, the first reinforcing member 36 can easily be broken when a physical impact is loaded to the vehicle.

Furthermore, because the first joint section 36a and the second joint section 36b provided at both edges of the first reinforcing member 36 are broken, the engine can move backward in the longitudinal direction of the vehicle, and a space provided in a front portion of the vehicle for absorbing the physical impact loaded to the vehicle can be enlarged.

What is claimed is:

1. A framework of a vehicle provided with an engine mounted in an engine room with a crank shaft oriented in a lateral direction of the vehicle; a subframe extending in the lateral direction of a space at the back of the engine in a longitudinal direction of the vehicle; a steering gear box provided above the subframe and extending in the lateral direction of the vehicle and an exhaust pipe extending in the longitudinal direction of the vehicle, the steering gear box and the exhaust pipe crossing each other; and a mounting device provided above the steering gear box for supporting the engine, wherein a recessed portion extending in the longitudinal direction of the vehicle is formed on a top surface portion of the subframe, the exhaust pipe is provided under the steering gear box in a state wherein a lower portion of the exhaust pipe goes into the recessed portion, wherein two arch-shaped reinforcing members spanning over the exhaust pipe are provided on a top surface of the subframe at positions away from each other in the longitudinal direction of the vehicle, the mounting device is fastened to the reinforcing members, one of the two arch-shaped reinforcing members comprising a front reinforcing member provided in a front portion of the vehicle that is made of a material which is easily broken when a physical impact is applied as compared to the other reinforcing member comprising a rear reinforcing member provided in a rear portion of the vehicle, and wherein strength of two edges of the front reinforcing member joined to the subframe are differentiated from each other.

2. The framework of a vehicle according to claim 1, wherein the rear reinforcing member provided in the rear portion of the vehicle is formed with an iron-based plate in a state wherein the rear reinforcing member is monolithic with the subframe and the front reinforcing member provided in the front portion of the vehicle is formed with an aluminum-based cast material.

* * * * *